United States Patent [19]
Berlinger, Jr.

[11] Patent Number: 5,318,144
[45] Date of Patent: Jun. 7, 1994

[54] PERSONAL MOBILITY VEHICLE

[75] Inventor: Bernard E. Berlinger, Jr., Furlong, Pa.

[73] Assignee: Assembled Systems, Inc., Horsham, Pa.

[21] Appl. No.: 521,117

[22] Filed: May 3, 1990

[51] Int. Cl.[5] .................... B62D 61/00; B62K 15/00
[52] U.S. Cl. .................................. 180/208; 180/216; 280/278
[58] Field of Search ............... 180/208, 209, 210, 216; 280/278

[56] References Cited

U.S. PATENT DOCUMENTS

| | | | |
|---|---|---|---|
| 1,312,648 | 8/1919 | Taussig | 180/208 |
| 2,322,477 | 11/1940 | Sjoberg | 180/291 |
| 2,817,406 | 12/1957 | Brewer | 180/11 |
| 3,043,389 | 7/1962 | Steinberg | 180/208 |
| 3,117,648 | 1/1964 | Landreth | 180/55 |
| 3,249,171 | 5/1966 | Kinghorn | 180/208 |
| 3,369,629 | 2/1968 | Weiss | 180/208 |
| 3,513,925 | 5/1970 | Figura | 180/208 |
| 3,580,349 | 5/1971 | Brennan et al. | 180/208 |
| 3,605,929 | 9/1971 | Rolland | 180/208 |
| 3,732,942 | 5/1973 | Hobbensiefken | 180/11 |
| 3,770,073 | 11/1973 | Meyer | 180/65.6 |
| 3,777,836 | 12/1973 | Riza | 180/208 |
| 3,842,927 | 10/1974 | Tantlinger | 180/11 |
| 4,570,739 | 2/1986 | Kramer | 180/216 |
| 4,635,742 | 1/1987 | Bertolini | 180/209 |
| 4,708,219 | 11/1987 | Cresswell | 180/11 |
| 4,750,578 | 6/1988 | Brandenfels | 180/13 |
| 4,757,868 | 7/1988 | Cresswell | 180/11 |
| 4,846,295 | 7/1989 | Shepard et al. | 180/68.5 |
| 4,861,058 | 8/1989 | Cresswell | 280/278 |
| 4,892,166 | 1/1990 | Gaffney | 180/208 |
| 4,909,525 | 3/1990 | Flowers | 180/210 |
| 4,944,359 | 7/1990 | Doman et al. | 180/208 |
| 4,947,955 | 8/1990 | Hopely, Jr. | 180/208 |

FOREIGN PATENT DOCUMENTS 8509172  8/1985  Fed. Rep. of Germany .

Primary Examiner—Kenneth R. Rice
Attorney, Agent, or Firm—Ratner & Prestia

[57] ABSTRACT

A personal mobility vehicle arranged for disassembly and assembly to facilitate transporting of the vehicle. A unitized drive unit, composed two drive wheels, a motor and a transmission for driving the drive wheels in response to the motor, is selectively mounted on and removed from a unitized support frame which serves as the basic support structure for the vehicle.

38 Claims, 4 Drawing Sheets

PERSONAL MOBILITY VEHICLE

TECHNICAL FIELD

The present invention relates to a personal mobility vehicle of the type which can be disassembled for portability.

BACKGROUND OF THE INVENTION

Personal mobility vehicles are used by individuals who have partial or total walking disabilities. Generally, personal mobility vehicles have a pair of rear wheels, a steerable front wheel, a seat for the user, a battery power source and a drive system which, in response to the electrical power supplied by the battery, drives the front wheel or the rear wheels to move the vehicle.

Various personal mobility vehicles are made for disassembly by the user or someone assisting the user, so that the vehicle can be easily transported, for example, in the trunk of an automobile. Those personal mobility vehicles of this type which are known to Applicant have a separable seat and a two-part support frame, with the drive system and the driven wheel or wheels mounted on one part of the support frame and the other wheels or wheel mounted on the other part of the support frame. Simply put, the support frame is "broken" down into two parts when the personal mobility vehicle is disassembled. U.S. Pat. No. 4,570,739 discloses such a personal mobility vehicle. "Breaking" the support frame can weaken the overall construction of the personal mobility vehicle and can require fairly complicated and elaborate attachment means which can be relatively costly and add to the weight of the vehicle, thereby making the disassembly, transporting and assembly of the vehicle difficult.

SUMMARY OF THE INVENTION

A personal mobility vehicle, constructed in accordance with the present invention, includes a chassis having a unitized support frame and means mounted on the unitized support frame for supporting the feet of a user of this personal mobility vehicle. This vehicle also includes a front wheel assembly, a rear wheel assembly and means for fixing one of the wheel assemblies to the chassis. This vehicle further includes means connected to one of the wheel assemblies for steering the personal mobility vehicle and a drive unit having a motor and transmission means for coupling the motor to the wheel assembly which is not fixed to the chassis. In addition, this personal mobility vehicle has releasable attachment means for selectively mounting the drive unit and the unfixed wheel assembly on the chassis for vertical support between the chassis and the mounted drive unit and wheel assembly and for selectively removing the mounted drive unit and wheel assembly from the chassis. In this way, a personal mobility vehicle, constructed in accordance with the present invention, is "broken down" by the releasable attachment means between the chassis and the drive unit, rather than by "breaking" a multi-part frame as in the prior art. Thus, for purpose of defining the present invention, "releasable attachment means" refers to devices or mechanisms which are arranged for intended assembly and disassembly of the chassis and the drive unit in an easy manner and on an as-needed basis by the user of the personal mobility vehicle or someone assisting the user. A personal mobility vehicle, constructed in accordance with the present invention, further includes a seat unit mounted on the chassis, a battery mounted on the chassis and control means for selectively applying electric power from the battery to the motor.

DETAILED DESCRIPTION OF THE INVENTION

Figure 1:
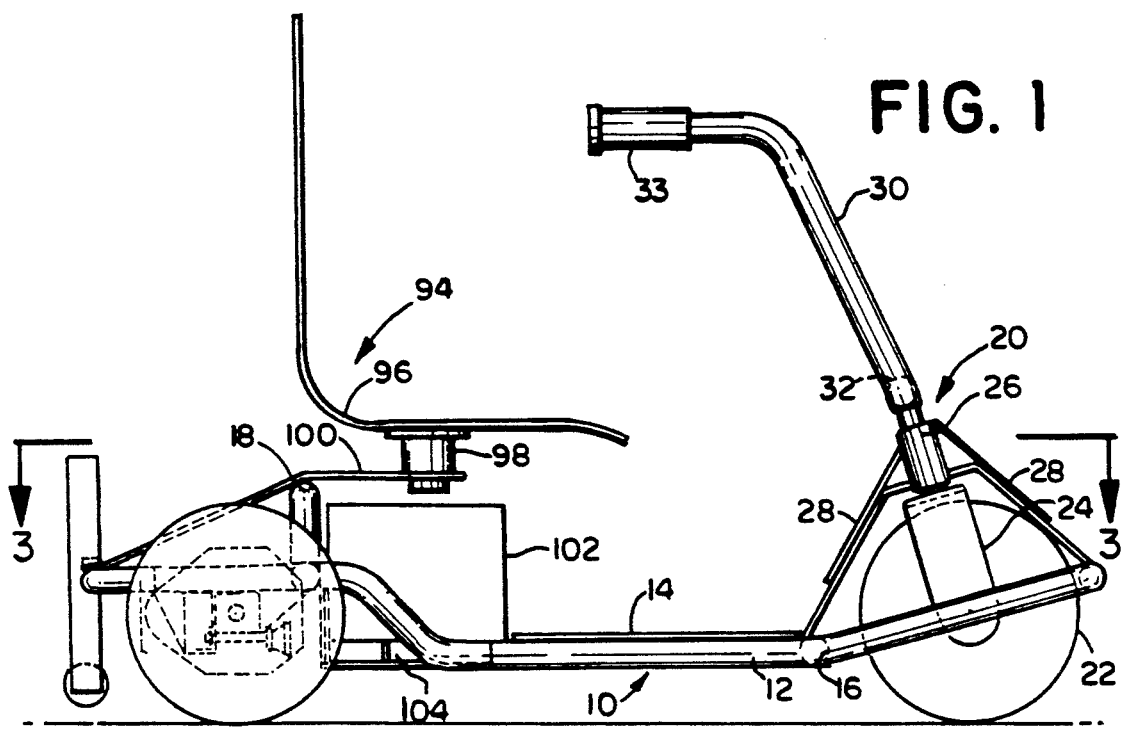
FIG. 1 is a side view of a first embodiment of a personal mobility vehicle constructed in accordance with the present invention.
Figure 3:
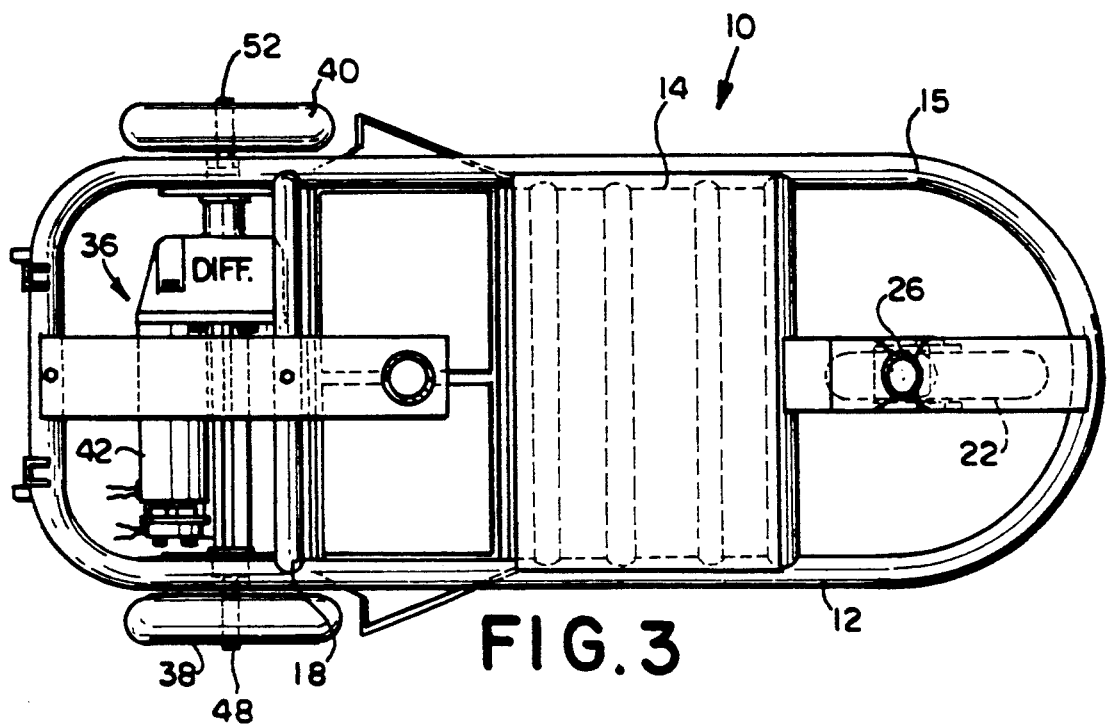
FIG. 3 is a horizontal sectional view taken along line 3—3 of FIG. 1
Figure 2:
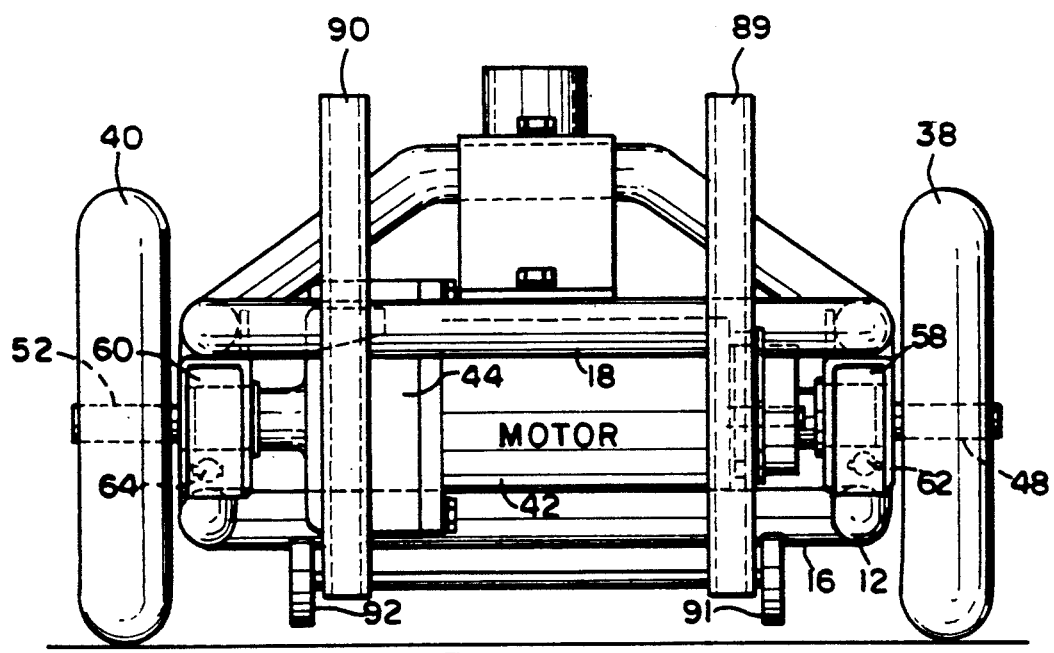
FIG. 2 is a rear view of the personal mobility vehicle of FIG. 1.

Referring to FIGS. 1, 2 and 3, a personal mobility vehicle, constructed in accordance with the present invention, includes a chassis 10 having a unitized support frame 12 and a pan 14 which serves to support the feet of a user of the personal mobility vehicle. By the words "unitized support frame," Applicant means a support frame which is not intended to be broken down for complete separation into two or more parts by the user or someone assisting the user. In the embodiment of the invention illustrated in FIGS. 1, 2 and 3, unitized support frame 12 is an integral, rigid unit, while in the embodiment of the invention illustrated in FIGS. 5 and 6, the unitized support frame is composed of two parts which are movable relative to one another by a telescoping arrangement but are not intended to be broken down for complete separation into two or more parts by the user or someone assisting the user.

Unitized support frame 12 is composed of a peripheral member 15, a front cross brace 16 and a rear cross brace 18. The components of unitized support frame 12 preferably are formed of round or rectangular steel or aluminum tubing or can be completely injection molded or formed plastic.

The personal mobility vehicle illustrated in FIGS. 1, 2 and 3 also includes a steering wheel assembly 20 mounted on chassis 10 and having at least one steerable, freely rotatable wheel 22. Steering wheel assembly 20 is disposed along a line transverse to the length of the unitized support frame which is no more forward along the length of the unitized support frame than the forwardmost point of the unitized support frame. As will become apparent from the further description of the FIGS. 1, 2 and 3 personal mobility vehicle, this embodiment of the invention has a rear wheel drive. It will be understood by those skilled in the art that the present invention can be applied to personal mobility vehicles having front wheel drives.

Wheel 22 is mounted on a front wheel yoke 24 by means of a suitable bearing which is not shown in the drawings. A front wheel spindle 26 is secured to the top of front wheel yoke 24. The front wheel spindle assembly, composed of front wheel spindle 26, front wheel yoke 24 and a plurality of spindle support brackets 28, is mounted on chassis 10 and, in particular, attached to peripheral member 15 and front cross brace 16 of unitized support frame 12.

Also included in the FIGS. 1, 2 and 3 embodiment of the present invention is a steering tiller 30 which is connected to steering wheel assembly 20. Specifically, steering tiller 30 is connected to front wheel spindle 26 of the front wheel spindle assembly by means of a tiltable joint 32 which permits the user of the personal mobility vehicle to adjust the angle of the tiller and the position of a handgrip 33 of the tiller. If desired, steering tiller 30 and tiltable joint 32 can be arranged for the steering tiller to be removable from the tiltable joint when the personal mobility vehicle is being disassembled for transporting.

A personal mobility vehicle, constructed in accordance with the present invention, further includes a drive system 36 having a pair of drive wheels 38 and 40, a motor 42 and transmission means for coupling the motor to the drive wheels. For the embodiment of the invention illustrated in FIGS. 1, 2 and 3, the drive system is at the rear of the personal mobility vehicle and drive wheels 38 and 40 are arranged to be driven by a differential transmission, located within a differential transmission housing 44 labelled "DIFF.", which, in turn, is driven by motor 42. The differential transmission, which can include speed reduction gearing, may be of conventional construction and operation in providing rotary movement by a pair of rear wheel axles 48 and 52, extending out of housing 44, in response to motor 42. With axles 48 and 52 extending along a line transverse to the length of the unitized support frame which is no further outward along the length of the unitized support frame, there is vertical support between the unitized drive unit and the chassis.

Rear drive wheel 38 is mounted on rear wheel axle 48 for rotational movement with axle 48. Rear drive wheel 40 is mounted on rear wheel axle 52 for rotational movement with axle 52.

Motor 42 also is mounted on housing 44 by suitable means. Thus, rear drive wheel 38 mounted on rear wheel axle 48, rear drive wheel 40 mounted on rear wheel axle 52, motor 42 and the differential transmission within housing 44 form a unitized drive unit which is very desirable to facilitate disassembly, transporting and assembly of the personal mobility vehicle.

A personal mobility vehicle, constructed in accordance with the present invention, further includes attachment means for selectively mounting the unitized drive unit on chassis 10 for vertical support between the unitized drive unit and the chassis and for selectively removing the unitized drive unit from the chassis. For the embodiment of the invention illustrated in FIGS. 1, 2 and 3, the unitized drive unit is selectively mounted on and selectively removed from the underside of unitized support frame 12.

The unitized drive unit is selectively mounted on and selectively removed from unitized support frame 12 by means of first and second brackets 58 and 60 and first and second lock pin units 62 and 64 which, respectively, cooperate with brackets 58 and 60. As shown most clearly in FIGS. 2 and 3, when mounted on the unitized support frame, the drive system extends between opposed lateral sides of the unitized support frame no further rearward along the length of the unitized support frame than the rearmost point of the unitized support frame. Because brackets 58 and 60 are identical, with one arranged for the right side of the personal mobility vehicle and the other for the left side, only bracket 58 and its associated lock pin unit 62 will be described in detail.

Figure 4:
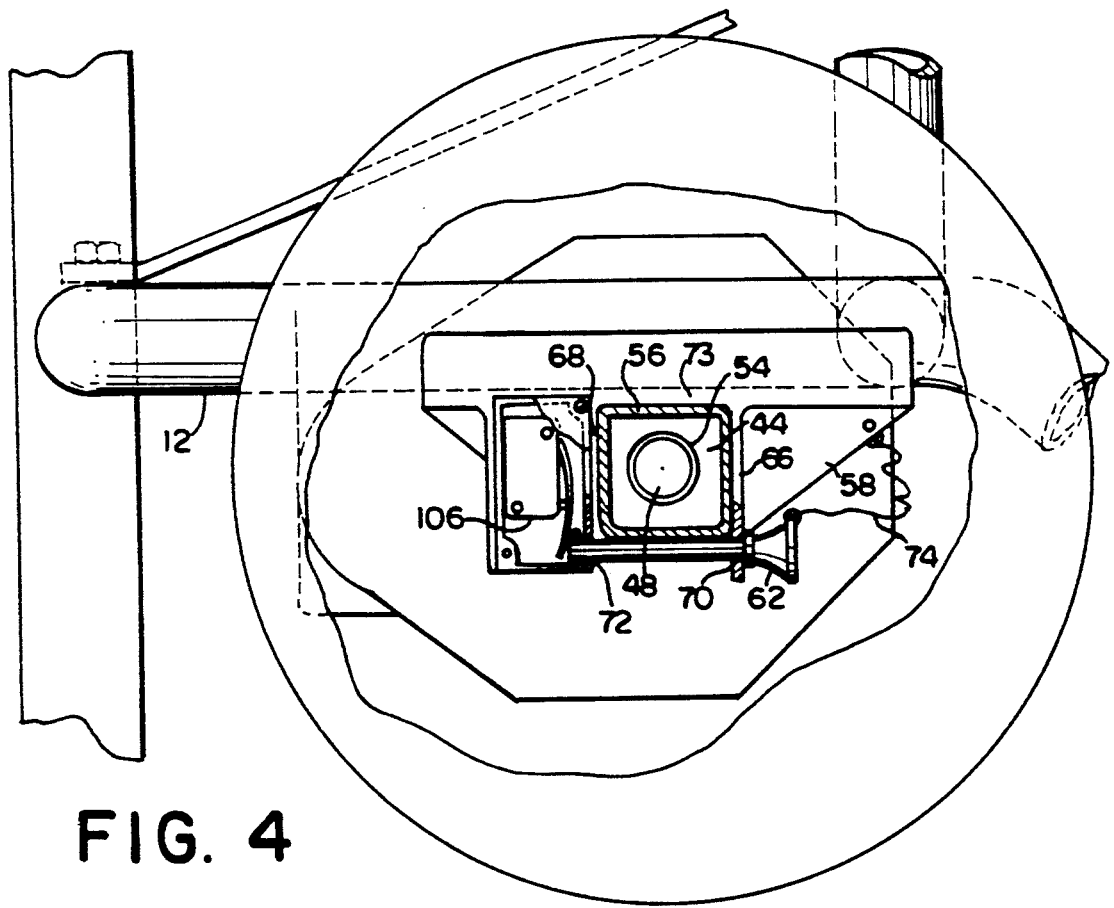
FIG. 4 shows, on an enlarged scale, an attachment bracket/lock pin unit assembly useful in a personal mobility vehicle constructed in accordance with the present invention.

Bracket 58 is attached to the underside of unitized support frame 12 by suitable means. Referring, in addition to FIG. 4, which shows the attachment bracket/lock pin unit assembly on an enlarged scale, bracket 58 has a pair of spaced walls 66 and 68 and a pair of aligned holes 70 and 72 in spaced walls 66 and 68, respectively. Lock pin unit 62 extends through aligned holes 70 and 72 and provides support for rear axle 48 which extends through bracket 58. In particular, rear axle 48 extends through a bushing 54 which is mounted to housing 44. Housing 44 preferably is isolated from bracket 58 by a restraint sleeve 56, formed from a resilient material such as rubber, which is fitted onto the housing. The outside shape of restraint sleeve 56 corresponds to the cross-sectional area defined by spaced walls 66 and 68, a wall 73 extending between spaced walls 66 and 68 and lock pin unit 62 and is fitted within this space. Lock pin unit 62 is attached to bracket 58 by a tether 74.

Figure 4A:
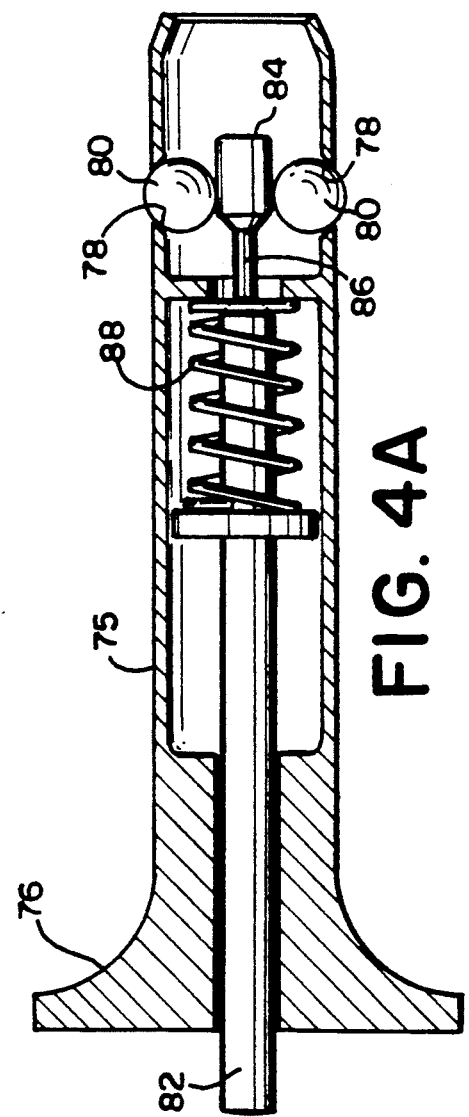
FIG. 4A shows, on an enlarged scale, the lock pin unit of FIG. 4.

Lock pin unit 62 is arranged with locking means for resisting withdrawal of the lock pin unit from bracket 58. As shown in FIG. 4A, lock pin unit 62 has a hollow pin 75 with a grip 76 at a first end and a pair of radial aligned holes 78 at a second end, namely the point end of the hollow pin. The distance between grip 76 and radial, aligned holes 78 is at least as great as the spacing between spaced walls 66 and 68 of bracket 58. A pair of balls 80 are captive to hollow pin 75 in radial, aligned holes 78. Lock pin unit 62 also has a plunger 82 which is movable axially of hollow pin 75. Plunger 82 has a first diameter section 84 which engages balls 80 to move balls 80 radially outward to protrude from hollow pin 75 and a second diameter section 86, spaced axially from first diameter section 84, which permits balls 80 to move radially inward to within the outside surface of hollow pin 75. A spring 88, located within hollow pin 74, urges plunger 82 to a position at which the first diameter section 84 of the plunger engages balls 80.

In operation, lock pin unit 62 is inserted in bracket 58 by the user pushing plunger 82 against the action of spring 88, so that as the lock pin unit is pushed through aligned holes 70 and 72 in spaced walls 66 and 68, respectively, of bracket 58 and balls 80 engage those portions of the spaced walls surrounding these holes, balls 80 are free to move radially inward because the second diameter section 86 of plunger 82 is aligned with balls 80. Upon insertion of lock pin unit 62 to a position where balls 80 have cleared wall 68, plunger 82 is released and lock pin unit 62 is locked in place. At this position of the lock pin unit, balls 80 protrude from the outside surface of hollow pin 75 and are prevented from moving radially inward when they abut against wall 68 because the first diameter section 84 of plunger 82 engages balls 80 to maintain the balls at their radially outermost position. To remove lock pin unit 62 from bracket 58, plunger 82 is pushed against the action of spring 88 and simultaneously the lock pin unit can be withdrawn.

For the embodiment of the invention illustrated in FIGS. 1, 2 and 3, the unitized drive unit can be selectively mounted on chassis 10 and selectively removed from the chassis while the personal mobility vehicle is in a vertical position resting on a pair of rear support brackets 89 and 90. The personal mobility vehicle, in this position, facilitates the withdrawal of lock pin units 62 and 64 from their associated attachment brackets 58 and 60. As indicated in FIGS. 1, 2 and 3, a pair of safety wheels 91 and 92 may be provided on rear support brackets 89 and 90, respectively, for the purpose of protecting against the personal mobility vehicle tipping over backwards as the user leans backwards.

A personal mobility vehicle, constructed in accordance with the present invention, also includes a seat unit 94 mounted on chassis 10. The seat unit illustrated in FIGS. 1, 2 and 3 includes a seat 96 mounted on a tubular seat support 98 which, in turn, is attached to a spring seat support bracket 100 which, in turn, is mounted on rear cross brace 18 of unitized support frame 12. Seat 96 and tubular seat support 98 are arranged for seat 96 to be removable when the personal mobility vehicle is disassembled for transporting.

Also included in a personal mobility vehicle, constructed in accordance with the present invention, are one or more batteries 102 which are mounted on chassis 10. Batteries 102 provide electric power for motor 42. A battery pan 104, attached to unitized support frame 12, provides a support surface for the batteries on which the batteries may be mounted by suitable means for selective removal of the batteries as the personal mobility vehicle is disassembled for transporting.

Lastly, a personal mobility vehicle, constructed in accordance with the present invention, includes control means for selectively applying electric power from batteries 102 to motor 42. Such control means may include the usual wiring from the batteries to the motor, a starter switch and a speed regulation control. In addition, as shown in FIG. 4, a safety, interlock switch 106 preferably is positioned in bracket 58. This switch is engaged by the point end of lock pin unit 62 when this lock pin unit has been inserted through both aligned holes 70 and 72 in spaced walls 66 and 68, respectively, to a predetermined position corresponding to complete insertion of the lock pin unit in bracket 58. Until switch 106 is engaged by lock pin unit 62, electric power from batteries 102 cannot be applied to motor 42. Once lock pin unit 62 has been inserted properly in bracket 58, switch 106 closes and permits electric power from batteries 102 to be applied to motor 42. A similar switch is associated with bracket 60 to assure complete and proper insertion of lock pin unit 64 in bracket 60.

Figure 6:
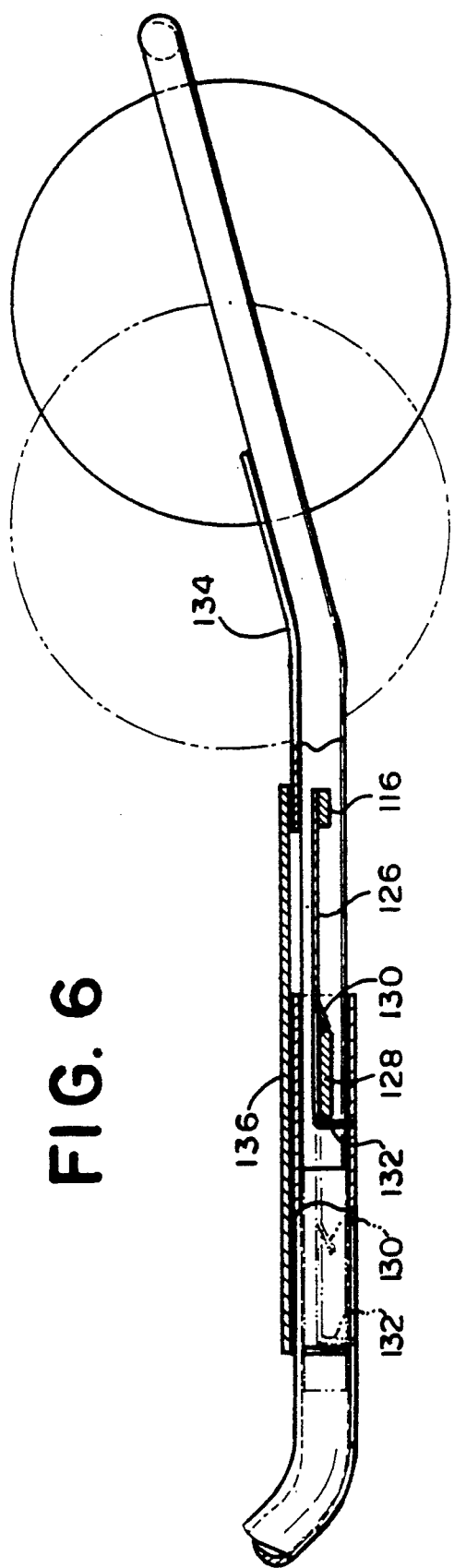
FIG. 6 is a side view of the chassis of FIG. 5.
Figure 5:
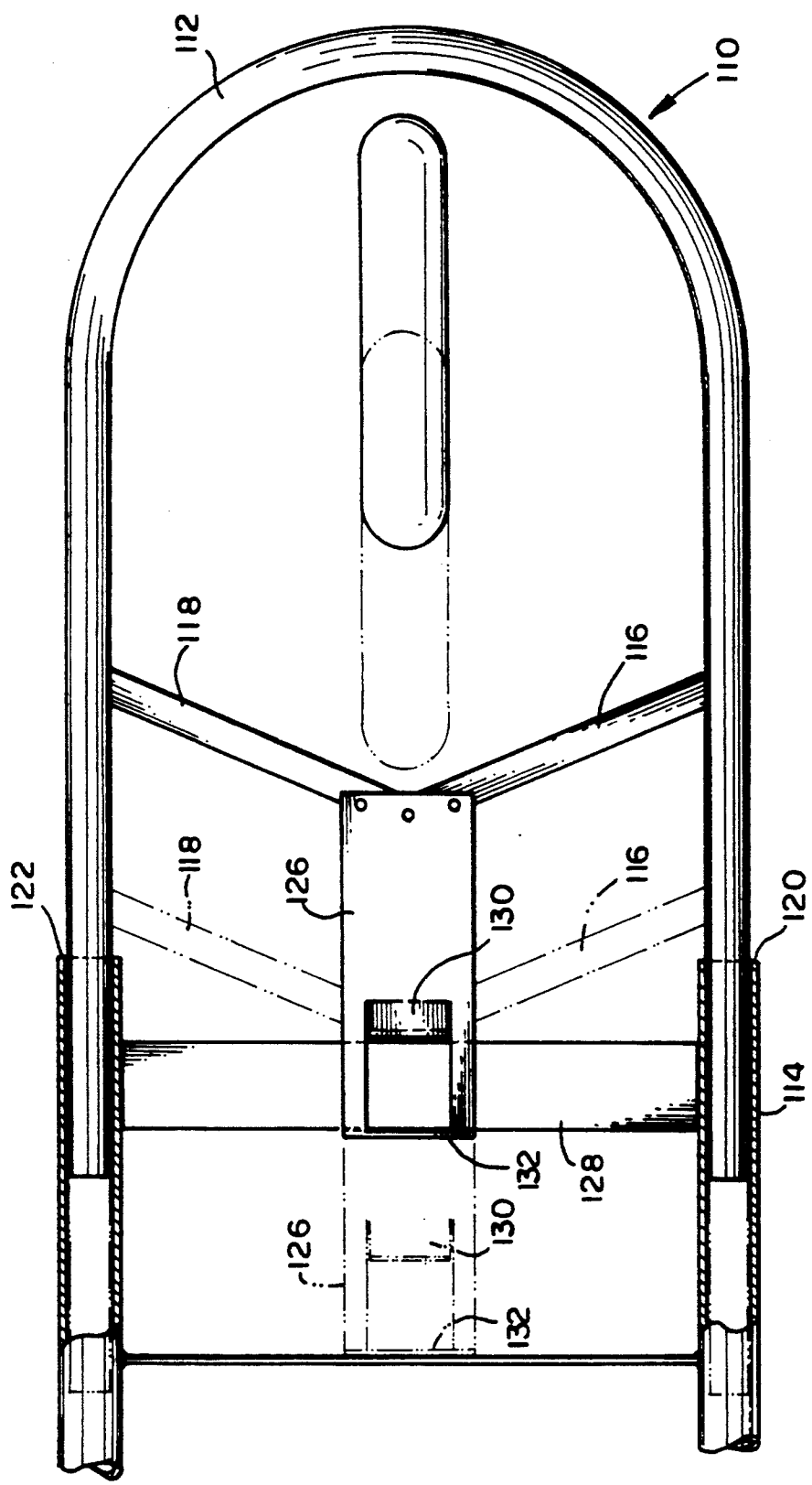
FIG. 5 is a plan view of a portion of the chassis of a second embodiment of a personal mobility vehicle constructed in accordance with the present invention.

FIGS. 5 and 6 are plan and side views, respectively, of a portion of the chassis of a second embodiment of a personal mobility vehicle constructed in accordance with the present invention. In the FIGS. 5 and 6 embodiment, the unitized support frame is a two-part telescoping unit, whereby the overall length of the chassis can be reduced for transporting, but the two parts are not intended for complete separation by the user or someone assisting the user.

Referring to FIGS. 5 and 6, unitized support frame 110 is composed of a front support part 112 and a rear support part 114, With the front support part movable Within the rear support part in a telescoping manner. Such movement is indicated by the dashed lines which represent the "collapsed" condition of unitized support frame 110.

The two support parts of unitized support frame 110 are arranged to limit relative movement between front support part 112 and rear support part 114 away from one another beyond the positions indicated by the solid lines and relative movement toward one another beyond the dashed line position of front support part 112 and the illustrated position of rear support part 114.

Movement of the two support parts toward one another is limited by the abutment of the outer ends of a pair of angled cross braces 116 and 118, which are parts of front support part 112, against ends 120 and 122, respectively, of rear support part 114 and the abutment of the inner ends of the angled cross braces against a cross brace 128 which is a part of rear support part 114. Such movement can take place by lifting spring clip 126 until a first tab 130, extending downwardly from the bottom of the spring clip, clears cross brace 128.

Movement of the two support parts of the unitized support frame away from one another is limited by the abutment of a second tab 132, extending downwardly from the bottom surface of spring clip 126, against cross brace 128. Such movement can take place by moving front support part 112 and rear support part 114 away from each other, with tab 130 simply riding over cross brace 128 and lifting spring clip 126. Tab 132 is dimensioned so that it will not clear cross brace 128 while spring clip 126 is lifted. Otherwise, front support part 112 and rear support part 114 could separate completely.

To accommodate the telescoping arrangement illustrated in FIGS. 5 and 6, the floor pan is in two parts. A first front pan 134 is attached to front support part 112 and a second rear pan 136 is attached to rear support part 114. As support parts 112 and 114 are moved toward each other, front pan 134 slides under rear pan 136. In addition, rear pan 136 limits upward movement of spring clip 126, so that tab 132 cannot clear cross brace 128, thereby providing additional protection against complete separation of front support part 112 and rear support part 114.

While in the foregoing there have been described preferred embodiments of the present invention, it should be obvious to those skilled in the art that various modifications and changes can be made without departing from the true spirit and scope of the invention.

I claim:

1. A personal mobility vehicle comprising:
   a chassis having a unitized support frame and means mounted on said unitized support frame for supporting the feet of a user of said personal mobility vehicle;
   a steering wheel assembly mounted on said chassis and having at least one steerable, freely rotatable wheel;
   means connected to said steering wheel assembly for steering said steering wheel assembly;
   a drive system having:
   (a) a pair of drive wheels,
   (b) axle means extending along a line transverse to the length of said unitized support frame which is no further outward along the length of said unitized support frame than the outermost points of said unitized support frame for mounting said drive wheels,
   (c) a motor, and
   (d) transmission means for coupling said motor to said axle means;
   releasable attachment means for selectively mounting said drive system on said chassis for vertical support between said drive system and said chassis and for selectively removing said drive system from said chassis;
   a seat unit mounted on said chassis;

a battery mounted on said chassis;

and control means for selectively applying electric power from said battery to said motor.

2. A personal mobility vehicle according to claim 1 wherein said transmission means include a differential transmission.

3. A personal mobility vehicle according to claim 2 wherein said transmission means include a housing within which said differential transmission is located and said drive wheels are mounted upon a pair of axles extending along said line transverse to said unitized support frame.

4. A personal mobility vehicle according to claim 3 wherein said axles extend from said differential transmission within said housing.

5. A personal mobility vehicle according to claim 1 wherein said unitized support frame is an integral, rigid unit and said steering wheel assembly and said seat unit are mounted on said unitized support frame.

6. A personal mobility vehicle according to claim 1 wherein said unitized support frame is a two-part telescoping unit having a front support part and a rear support part.

7. A personal mobility vehicle according to claim 6 further including means for limiting movement between said support parts of said two-part telescoping unit toward and away from one another.

8. A personal mobility vehicle according to claim 7 wherein said feet supporting means include a first pan attached to one of said support parts of said two-part telescoping unit and a second pan attached to the other of said support parts of said two-part telescoping unit and said second pan moves under said first pan as said support parts of said two-part unit are moved toward each other.

9. A personal mobility vehicle according to claim 1 wherein said steering means include a steering tiller.

10. A personal mobility vehicle comprising:

a chassis having a unitized support frame and a floor pan attached to said frame;

a front wheel spindle assembly mounted on said chassis for pivotal movement;

a front wheel mounted on said front wheel spindle assembly for free rotational movement of said front wheel;

means connected to said front wheel spindle assembly for steering said front wheel;

a unitized rear drive unit having:
  (a) a pair of spaced apart rear wheels,
  (b) a motor, and
  (c) drive means for driving said rear wheels in response to said motor, said drive means including a differential transmission having first and second rear axles upon which said rear wheels are mounted for rotational movement with said first and said second rear axles;

releasable attachment means through which said first and said second rear axles extend for selectively mounting said unitized rear drive unit on the underside of said unitized support frame for vertical support between said unitized rear drive unit and said unitized support frame and for selectively removing said unitized rear drive unit from said unitized support frame, said releasable attachment means including:
  (a) a first bracket attached to said underside of said unitized support frame and having:
    (i) a pair of spaced walls between which said first rear axle is positioned, and
    (ii) a pair of aligned holes, one in each of said spaced walls,
  (b) a first lock pin unit extending through said aligned holes and upon which said first rear axle is supported,
  (c) a second bracket, spaced from said first bracket, attached to said underside of said unitized support frame and having:
    (i) a pair of spaced walls between which said second rear axle is positioned, and
    (ii) a pair of aligned holes, on in each of said spaced walls of said second bracket, and
  (d) a second lock pin unit extending through said aligned holes of said second bracket and upon which said second rear ale is supported;

a seat unit mounted on said chassis;

a battery mounted on said chassis;

and control means for selectively applying electric power from said battery to said motor.

11. A personal mobility vehicle according to claim 10 further including:
  (a) a first bushing through which said first rear axle extends and positioned within the cross-sectional area defined by said pair of spaced wall of said first bracket, a wall extending between said pair of spaced walls of said first bracket, and said first lock pin unit, and
  (b) a second bushing through which said second rear axle extends and positioned within the cross-sectional area defined by said pair of spaced walls of said second bracket, a wall extending between said pair of spaced walls of said second bracket, and said second lock pin unit.

12. A personal mobility vehicle according to claim 11 wherein said drive means include a housing within which said differential transmission is located and from within which said first and said second rear axles extend and upon which said motor is mounted.

13. A personal mobility vehicle according to claim 12 wherein said first and said second bushings are mounted to said housing.

14. A personal mobility vehicle according to claim 13 wherein said control means include:
  (a) a first switch engaged by said first lock pin unit when said first lock pin unit has been inserted through both said aligned holes of said first bracket to a predetermined position to close said control means and permit electric power from said battery to be applied to said motor, and
  (b) a second switch engaged by said second lock pin unit when said second lock pin unit has been inserted through both said aligned holes in said second bracket to a predetermined position to close said control means and permit electric power from said battery to be applied to said motor.

15. A personal mobility vehicle according to claim 14 wherein each of said lock pin units include locking means for resisting withdrawal of said lock pin units from said predetermined positions.

16. A personal mobility vehicle according to claim 15 wherein each of said lock pin units include:
  (a) a hollow pin having a grip at a first end thereof and a pair of radial, aligned holes at a second end thereof, the distance between said grip and said radial, aligned holes being at least as great as the spacing between said spaced walls of the associated bracket, (b) a pair of balls captive to said hollow pin in said radial, aligned holes, (c) a plunger movable axially of said hollow pin within said hollow pin and having a first diameter section which engages said balls to move said balls radially outward to protrude from said hollow pin and a second diameter section, spaced axially from said first diameter section, which permits said balls to move radially inward to within the outside surface of said hollow pin, and (d) means for urging said plunger to a position at which said first diameter section of said plunger engages said balls.

17. A personal mobility vehicle according to claim 16 wherein each of said switches is positioned to be engaged by said second end of one of said hollow pins.

18. A personal mobility vehicle comprising:
a chassis having a unitized support frame and a floor pan attached to said frame;
a front wheel spindle assembly mounted on said chassis for pivotal movement;
a front wheel mounted on said front wheel spindle assembly for free rotational movement of said front wheel;
means connected to said front wheel spindle assembly for steering said front wheel;
a unitized rear drive unit having:
(a) a pair of spaced apart rear wheels,
(b) axle means extending along a line transverse to the length of said unitized support frame which is not further rearward along the length of said unitized support frame than the rearmost point of said unitized support frame for mounting said rear wheels,
(c) a motor, and
(d) drive means for coupling said motor to said axle means;
releasable attachment means for selectively mounting said unitized rear drive unit on said chassis for vertical support between said unitized rear drive unit and said chassis and for selectively removing said unitized rear drive unit from said chassis;
a seat unit mounted on said chassis;
a battery mounted on said chassis;
and control means for selectively applying electric power from said battery to said motor.

19. A personal mobility vehicle according to claim 18 wherein said unitized rear drive unit is selectively mounted on and selectively removed from the underside of said unitized support frame.

20. A personal mobility vehicle according to claim 18 wherein said steering means include a steering tiller.

21. A personal mobility vehicle comprising:
a chassis having a unitized support frame and means mounted on said unitized support frame for supporting the feet of a user of said personal mobility vehicle;
a steering wheel assembly mounted on said chassis;
means connected to said steering wheel assembly for steering said steering wheel assembly;
a drive system having:
(a) a pair of drive wheels;
(b) axle means extending along a line transverse to the length of said unitized support frame beneath said unitized support frame for mounting said drive wheels,
(c) a motor, and
(d) transmission means for coupling said motor to said said axle means;
releasable attachment means for selectively mounting said drive system on said chassis for vertical support between said drive system and said chassis and for selectively removing said drive system from said chassis;
a seat unit mounted on said chassis;
a battery mounted on said chassis;
and control means for selectively applying electric power from said battery to said motor.

22. A personal mobility vehicle according to claim 21 wherein said steering means include a steering tiller.

23. A personal mobility vehicle according to claim 21 wherein said transmission means include a differential transmission and said drive wheels are mounted upon first and second axles which extend along said line transverse to the length of said unitized frame.

24. A personal mobility vehicle comprising:
a chassis having a unitized support frame and means mounted on said unitized support frame for supporting the feet of a user of said personal mobility vehicle:
a front wheel assembly disposed along a first line transverse to the length of said unitized support frame which is no more forward along the length of said unitized support frame than the forwardmost point of said unitized support frame;
a rear wheel assembly disposed along a second line transverse to the length of said unitized support frame which is no more rearward along the length of said unitized support frame then the rearmost point of said unitized support frame;
means for fixing one of said wheel assemblies to said chassis;
means connected to one of said front wheel assembly and said rear wheel assembly for steering one of said front wheel assembly and said rear wheel assembly;
a drive unit having:
(a) a motor, and
(b) transmission means for coupling said motor to said wheel assembly not fixed to said chassis;
releasable attachment means for selectively mounting on said chassis said drive unit and said wheel assembly not fied to said chassis for vertical support between said chassis and said mounted drive unit and wheel assembly and for selectively removing said mounted drive unit and wheel assembly from said chassis;
a seat unit mounted on said chassis;
a battery mounted on said chassis;
and control means for selectively applying electric power from said battery to said motor.

25. A personal mobility vehicle according to claim 24 wherein one of said front wheel assembly and said rear wheel assembly includes a pair of wheels and said transmission means include a differential transmission coupled to said pair of wheels.

26. A personal mobility vehicle according to claim 24 wherein said steering means include a steering tiller.

27. A personal mobility vehicle comprising:
a chassis having a unitized support frame and means mounted on said unitized support frame for supporting the feet of a user of said personal mobility vehicle;

a steering wheel assembly mounted on said chassis and having at least one steerable, freely rotatable wheel;
means connected to said steering wheel assembly for steering said steering wheel assembly;
a drive system extending between opposed lateral sides of said unitized support frame and having:
(a) a pair of drive wheels,
(b) a motor, and
(c) transmission means for coupling said motor to said drive wheels;
releasable attachment means for selectively mounting said drive system on said chassis for vertical support between said drive system and said chassis and for selectively removing said drive system from said chassis;
a seat unit mounted on said chassis;
a battery mounted on said chassis;
and control means for selectively applying electric power from said battery to said motor.

28. A personal mobility vehicle according to claim 27 wherein said unitized support frame is an integral, rigid unit and said steering wheel assembly is mounted on said unitized support frame.

29. A personal mobility vehicle according to claim 27 wherein said unitized support frame is a two-part telescoping unit having a front support part and a rear support part and said steering wheel assembly is mounted on said unitized support frame.

30. A personal mobility vehicle comprising:
a chassis having a unitized support frame and a floor pan attached to said frame;
a front wheel spindle assembly mounted on said chassis for pivotal movement;
a front wheel mounted on said front wheel spindle assembly for free rotational movement of said front wheel;
means connected to said front wheel spindle assembly for steering said front wheel;
a unitized rear drive unit extending between opposed lateral sides of said unitized support frame and having:
(a) a pair of spaced apart rear wheels,
(b) a motor, and
(c) drive means for driving said rear wheels in response to said motor;
releasable attachment means for selectively mounting said unitized rear drive unit on said chassis for vertical support between said unitized rear drive unit and said chassis and for selectively removing said unitized rear drive unit from said chassis;
a seat unit mounted on said chassis;
a battery mounted on said chassis;
and control means for selectively applying electric power from said battery to said motor.

31. A personal mobility vehicle according to claim 30 wherein said unitized support frame is an integral, rigid unit and said front wheel spindle assembly is mounted on said unitized support frame.

32. A personal mobility vehicle according to claim 30 wherein said unitized support frame is a two-part telescoping unit having a front support part and a rear support part and said front wheel spindle assembly is mounted on said unitized support frame.

33. A personal mobility vehicle comprising:
a chassis having a unitized support frame and means mounted on said unitized support frame for supporting the feet of a user of said personal mobility vehicle;
a steering wheel assembly mounted on said chassis;
means connected to said steering wheel assembly for steering said steering wheel assembly;
a drive system extending between opposed lateral sides of said unitized support frame and having:
(a) a drive wheel assembly,
(b) a motor, a
(c) transmission means for coupling said motor to said drive wheel assembly;
releasable attachment means for selectively mounting said drive system on said chassis for vertical support between said drive system and said chassis and for selectively removing said drive system from said chassis;
a seat unit mounted on said chassis;
a battery mounted on said chassis;
and control means for selectively applying electric power from said battery to said motor.

34. A personal mobility vehicle according to claim 33 wherein said unitized support frame is an integral, rigid unit and said steering wheel assembly is mounted on said unitized support frame.

35. A personal mobility vehicle according to claim 33 wherein said unitized support frame is a two-part telescoping unit having a front support part and a rear support part and said steering wheel assembly is mounted on said unitized support frame.

36. A personal mobility vehicle comprising:
a chassis having a unitized support frame and means mounted on said unitized support frame for supporting the feet of a user of said personal mobility vehicle;
a front wheel assembly;
a rear wheel assembly;
means for fixing one of said wheel assemblies to said chassis;
means connected to one of said front wheel assembly and said rear wheel assembly for steering one of said front wheel assembly and said rear wheel assembly;
a drive unit extending between opposed lateral sides of said unitized support frame and having:
(a) a motor, and
(b) transmission means for coupling said motor to said wheel assembly not fixed to said chassis;
releasable attachment means for selectively mounting on said chassis said drive unit and said wheel assembly not fied to said chassis for vertical support between said chassis and said mounted drive unit and wheel assembly and for selectively removing said mounted drive unit and wheel assembly from said chassis;
a seat unit mounted on said chassis;
a battery mounted on said chassis;
and control means for selectively applying electric power from said battery to said motor.

37. A personal mobility vehicle according to claim 36 wherein said unitized support frame is an integral, rigid unit and said fixed wheel assembly is mounted on said unitized support frame.

38. A personal mobility vehicle according to claim 36 wherein said unitized support frame is a two-part telescoping unit having a front support part and a rear support part and said fixed wheel assembly is mounted on said unitized support frame.

* * * * *

UNITED STATES PATENT AND TRADEMARK OFFICE
CERTIFICATE OF CORRECTION

PATENT NO. : 5,318,144
DATED : June 7, 1994
INVENTOR(S) : Bernard E. Berlinger, Jr.

It is certified that error appears in the above-identified patent and that said Letters Patent is hereby corrected as shown below:

Column 3, line 36, after "frame" and before the comma, insert --than the outermost points of the unitized support frame--

Claim 10, column 8, line 13, delete "on" and insert therefor --one--

Claim 24, column 10, line 48, delete "fied" and insert therefor --fixed--

Claim 33, column 12, line 9, delete "a" (second occurrence) and insert therefor --and--

Claim 36, column 12, line 50, delete "fied" and insert therefor --fixed--

Signed and Sealed this

Twenty-seventh Day of September, 1994

Attest:

BRUCE LEHMAN

Attesting Officer

Commissioner of Patents and Trademarks